Patented June 24, 1941

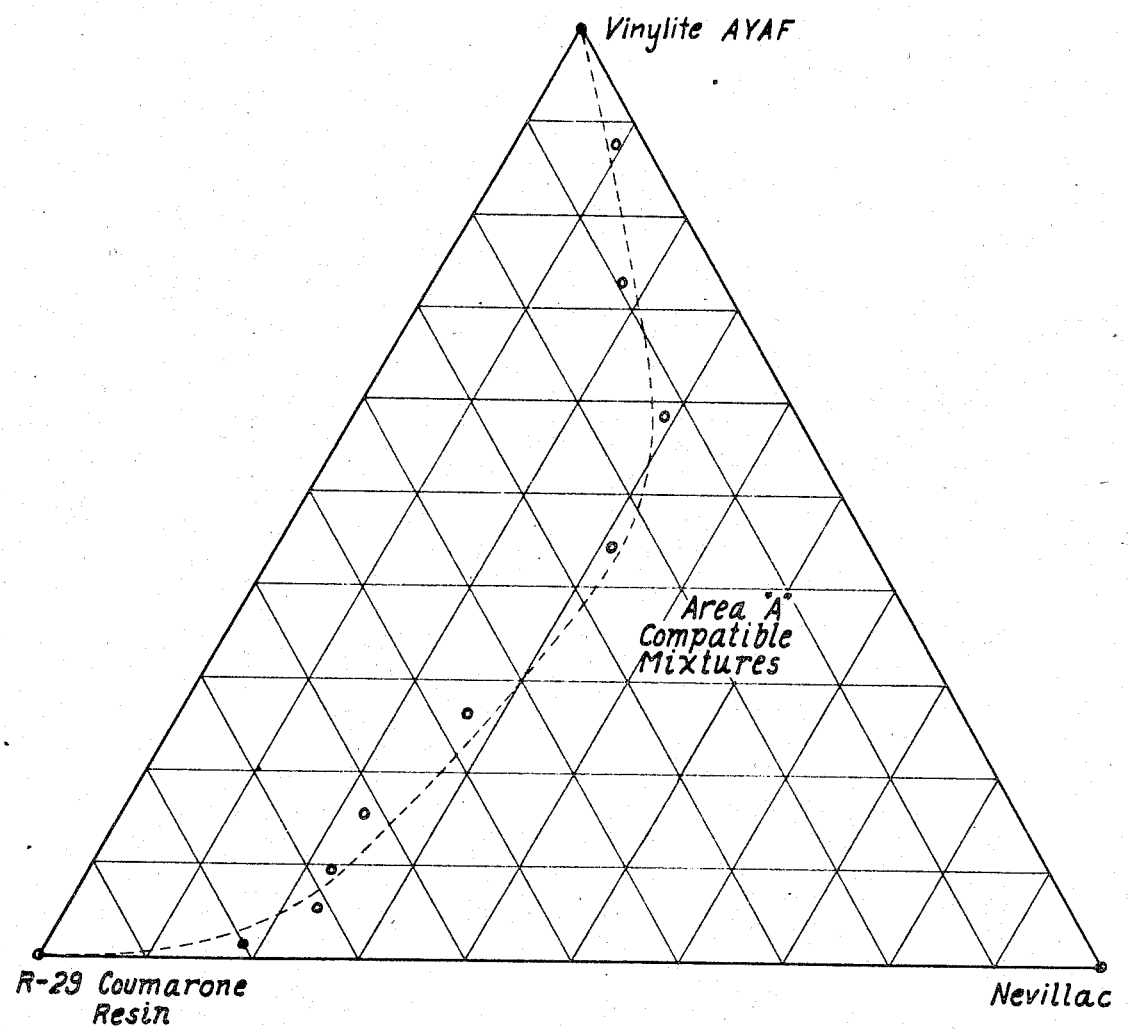

2,247,154

UNITED STATES PATENT OFFICE 2,247,154

RESIN

Lyle M. Geiger, Crafton, and William D. Johnston, Jr., Avalon, Pa., assignors to The Neville Company, Pittsburgh, Pa., a corporation of Pennsylvania Application April 25, 1938, Serial No. 203,980

4 Claims. (Cl. 260—42)

This invention relates to improvements in blending vinyl acetate polymers with other resinous bodies through the use of phenol-modified coumarone resins.

It is among the objects of the invention to provide resin compositions combining satisfactory thermoplastic properties with unusual toughness and elasticity.

Another object is to provide blends of vinyl acetate polymer and resins normally incompatible therewith, by the use of phenol-modified coumarone resin.

A specific object is to provide compositions containing coumarone resin and polymerized vinyl acetate, which are homogeneous and possess physical properties which render them desirable in the arts.

A further object is to provide a method of making compositions of the types referred to.

Other objects will appear from the following description.

The so-called coumarone resins are produced by polymerization of certain constituents of crude solvent naphtha produced in the by-product coking of coal. The polymerizable constituents of such naphthas are commonly coumarone and indene and their homologs, which are present in amounts and proportions which depend upon the proximate source from which the naphthas are derived as well as upon the operating conditions by which the naphthas are produced. Such naphthas may contain also other polymerizable constituents, such as dicyclopentadiene. Depending upon such factors as well as upon treatments of the naphtha to fractionate the polymerizable constituents more or less completely, the polymers produced may thus comprise predominantly polycoumarone or polyindene, or mixtures of both, or polymers of the other polymerizable constituents alluded to. Commonly the commercial resins resultant from crude solvent naphtha are considered as being mixtures of coumarone and indene polymers. For brevity reference will be made herein to coumarone resin but from what has been said it will be understood that the term contemplates the class of resins producible from crude solvent naphtha produced in the by-product coking of coal. As understood in the art, such resins may be soft or hard, depending on the relative proportions of the lower and higher polymers.

Coumarone resins possess properties which render them valuable for many purposes. In particular, their resistance to water, acids and alkalies coupled with their thermoplastic nature provides a combination of properties desirable in molding plastics. These resins have not found extensive application for such purposes, however, because of their inherent brittleness and low strength, and up to the time of this invention plasticizing, or tempering, of the coumarone resins to adapt them to thermoplastic molding has not been achieved in a completely satisfactory manner. For instance, some materials must be used in large amounts to provide the necessary toughness and strength, while the properties of others are such that the mixtures do not provide to the fullest extent the desirable properties of the coumarone resin. The vinyl acetate polymers possess properties such that, other things being equal, they might be compounded with coumarone resin without detriment to its desirable properties, but it has not heretofore been possible to use them with ordinary coumarone resins of commerce because the two are incompatible.

We have discovered, and it is upon this that our invention is predicated in part, that phenol-modified coumarone resins are, in contrast with ordinary coumarone resins, highly compatible with vinyl acetate polymers with production of homogeneous thermoplastic compositions of unusual toughness and elasticity, and that very small amounts of the vinyl acetate polymer suffice for the purposes of the invention. The harder grades of phenol-modified coumarone resins are similar to ordinary, or unmodified, coumarone resins to the extent that they are highly brittle and of low strength, but for some reason not fully apparent, the phenolic involvement of the former confers compatibility with vinyl acetate polymers.

Phenol-modified coumarone resins are those produced from the polymerizable constituents of crude solvent naphtha by polymerization with concurrent involvement with a phenolic body. Various procedures are available for the production of such phenol-modified coumarone resins, such as that described in German Patent No. 302,543. An improved procedure is disclosed in Patent No. 2,077,009, granted April 13, 1937, to Joseph Rivkin, in accordance with which phenol-modified coumarone resin is produced by effecting the polymerization, in the presence of a phenolic body, such as cresols, phenols, naphthas, and the like, which is reactive with the polymerizable constituents in the naphtha, by means of activated clay and with moderately elevated temperatures, for instance, in the neighborhood of 100° C., the reaction body being agitated during the course of the reaction.

Still another improved procedure for the production of phenol-modified coumarone resin is described in application for United States Letters Patent Serial No. 89,847, filed July 9, 1936, by Joseph Rivkin. As disclosed therein, the phenolic involvement is achieved through the conjoint use of a sulfuric acid base catalyst and a phenolic reagent in a quantity by weight not less than about 22 per cent of the weight of the polymerizable constituents of the crude solvent naphtha. During the progress of the reaction the reacted body is agitated and its temperature is maintained below about 60° C., most suitably within the range 25° to 35° C. The term "sulfuric acid base catalyst" is used in this instance to refer concisely to concentrated sulfuric acid or derivatives thereof obtained by the substitution of at least one hydrogen atom or one hydroxyl group of the sulfuric acid by an aliphatic or an aromatic group which may, in turn, be substituted by other groups, such as hydroxyl groups, amine groups, and the like. This latter procedure results, in general, in products having a lower acid number than characterizes the phenol-modified resins produced by the procedures referred to hereinabove.

Depending upon the manner in which the phenolic involvement is accomplished, there is produced polymerized material in the form of a more or less soft or oily body which may be separated, as by steam distillation, into hard resins, comprising chiefly higher polymers, and more or less soft or fluid resins, comprising chiefly lower polymers and in the trade termed phenolic heavy oil by analogy to the similar heavy oil produced through fractionation of the product of ordinary polymerization of the reactive bodies in crude solvent naphtha. Both fractions are phenolically modified, and both may be used in the practice of the present invention.

We have discovered furthermore that not only is phenol-modified coumarone resin itself satisfactorily compatible with vinyl acetate polymers, but also that such binary compositions are capable of blending compatibly with resins incompatible with vinyl acetate polymers but compatible with phenol-modified coumarone resin, with production of three-component blends having desirable properties. In other words, resins incompatible with vinyl acetate polymers but compatible with phenol-modified coumarone resins, are compatibly blendable with the two to provide three-component blends, and although the three components may not in each instance be compatible in all proportions the range of compatibility and the properties of the blends are such as to be commercially desirable, especially because it is thereby possible to compound vinyl acetate polymers with resins that could not be used satisfactorily therewith heretofore. For instance, it is possible in this manner to compound ordinary coumarone resin with vinyl acetate polymers which, so far as we are aware, has not been accomplished heretofore.

Referring first to the simple blending of phenol-modified coumarone resin with vinyl acetate polymer, very small amounts of the latter suffice to effect radical changes in the characteristics of the former. In fact, mixes of phenol-modified coumarone resin with as little as 5 to 10 per cent of vinyl acetate polymer possess physical properties so different from those of the individual materials that observation of the blend does not enable one having no knowledge of its constituents to judge their presence. Smaller amounts than those stated might be used but generally a minimum of about 5 per cent of vinyl acetate polymer is needed to confer good toughness and strength. Larger amounts may be used, but partly for reasons of economy it is desirable in general to use not more than about 50 per cent of vinyl acetate polymer.

Such mixes are suitably thermoplastic, tough and strong for molding purposes. The melting point of the phenol-modified coumarone resin is generally raised. This is indicated by, for example, a blend of 90 per cent of phenol-modified coumarone resin of 86° C. melting point sold as "Nevillac" by The Neville Company, of Pittsburgh, Pennsylvania, and 10 per cent of a vinyl acetate polymer sold by Carbide & Carbon Chemicals Corporation as "Vinylite" grade AYAF. The resultant mix had a melting point of 103° C. Again, a mixture of equal parts of the same phenol-modified resin and the same grade of "Vinylite" could not be melted; this composition softened at high temperatures, about 160° C., to the extent that it could be molded under pressure, and it was extremely hard, devoid of brittleness and of great strength for such materials. Such compositions are of great utility as molding powders.

As stated hereinabove, we have discovered further that the use of phenol-modified coumarone resin makes it possible to produce compatible three-component blends of vinyl acetate polymer and resins compatible with the former but not with the latter material. As exemplifying this aspect of the invention, reference may be made to blends made from phenol-modified coumarone resin, "Vinylite" AYAF, and various other resins which are not alone compatible with "Vinylite" AYAF. In these tests there was made up a base mix of nine parts of phenol-modified coumarone resin and one part of the stated vinyl acetate polymer, and to portions of this base mix there were added progressively increasing amounts of the third component to ascertain the limits of compatibility of the latter. The solubilizing action of phenol-modified coumarone resin upon these mutually incompatible materials is shown in the following table:

| "Nevillac" | "Vinylite" | Other resin | |
|---|---|---|---|
| | | Maximum percent compatible | Type and source |
| Percent 9 | Percent 1 | At least 90 | "Wood Rosin FF" (Hercules Powder Co.). |
| 27 | 3 | 70 | Ester Gum (glycerol-rosin ester). |
| 34.6 | 3.8 | 61.6 | "G" Resin (cyclopentadiene) (The Neville Co.). |
| 45 | 5 | 50 | "Glyptal" #1247 (Alkyd) (General Electric Co.). |
| 48.7 | 5.4 | 45.9 | "Petrex" #11 (Alkyd) (Hercules Powder Co.). |

Similar results are attainable with other resins compatible with the phenol-modified coumarone resin but not compatible with the vinyl acetate polymers. Thus, this has been demonstrated with, for example, "Resoglaz," a polystyrene resin sold by Advance Solvents and Chemical Co.; "Ethocel" 18-V, an ethyl cellulose sold by Dow Chemical Co.; "Tornesit" 125-V, a chlorinated rubber sold by Hercules Powder Co.; "Uformite" F-224, an urea-formaldehyde resin sold by The Resinous Products & Chemical Co., Inc., hydrogenated coumarone-indene resin, Monsanto "Petroleum Resin," and "Nuba" No. 1 resin sold by The Neville Company. The last-named material is a coumarone resin produced from the still residue remaining after fractionation of light oils originating and recovered in the by-product coking of coal. The residue is a mixture of resins and oils, and by steam distillation to remove oils there is recovered a solid resin of sulfonated nature and comprising chiefly coumarone resin. As showing its compatibility with vinyl acetate polymer through the practice of this invention, tests have shown that as much as 63 per cent of such "Nuba" resin, No. 1 grade, is compatible with 33.3 per cent of "Nevillac" and 3.7 per cent of "Vinylite" AYAF.

This aspect of the invention is exemplified particularly well by the blending of ordinary coumarone resin with vinyl acetate polymer. By the use of phenol-modified coumarone resin in accordance with the invention it is possible to provide homogeneous blends containing very large amounts of ordinary coumarone resin through the use of very small amounts of vinyl acetate polymer, while attaining desirable plastic and physical properties. For instance, as little as 2 to 10 per cent of vinyl acetate polymer suffices for the purposes of the invention; larger amounts might be used, of course, if desired. The following table shows the results obtained with two widely varying grades of coumarone-indene resin made by The Neville Company, of Pittsburgh, Pennsylvania, the tests being conducted in the manner described in connection with the foregoing table:

| "Nevillac" | "Vinylite" | Coumarone resin—unmodified | |
|---|---|---|---|
| | | Maximum percent compatible | Grade |
| Percent 37.5 | Percent 4.2 | 58.3 | R-3 (M. P. over 150° C.). |
| 18.0 | 2.0 | 80.0 | R-29 (M. P. 36° C.). |

The accompanying graph illustrates this further with reference to the compatibility of the R-29 grade coumarone shown in the foregoing table, "Nevillac" phenol-modified coumarone resin, and "Vinylite" AYAF. There were prepared a series of blends varying from one part of "Vinylite" to nine parts of "Nevillac," on the one hand, to nine parts of the former to one part of the latter, on the other hand. To facilitate handling, the blends from 6:4 to 9:1 were made from solutions of the resins in toluol. To these blends there were added increasing quantities of the R-29 coumarone resin. The solutions were flowed onto glass panels, and if cloudiness or opacity developed upon evaporation of the solvent, the proportions were taken as being incompatible. In the triangular graph field A represents the compatible proportions of this tri-component system, and the ability of the phenol-modified coumarone resin in producing compatible blends is evidenced by the fact that this field encompasses approximately 65 per cent of all possible combinations of these three constituents.

In the foregoing tests there were used hard grades of phenol-modified resin. The invention is applicable also to the use of the softer grades, such as phenolic heavy oil, as referred to hereinabove. As exemplifying this, one blend that has been made contained 3.6 per cent of "Vinylite," 32.2 per cent of phenolic heavy oil, and 64.2 per cent of a coumarone-indene resin containing about 90 per cent of indene polymer and having a melting point in excess of 150° C.

Three methods are in general use for the compounding, or blending, of resin compositions. One involves the use of a common solvent, or the blending of two or more resin solutions. The second resides in milling the resins together in a suitable device, thus producing merely mechanical homogenization. The third consists in melting one or more of the resins together with agitation in the molten state to bring about solution or blending. This latter method is, in general, desirable because it eliminates the use of volatile solvents together with the resultantly necessary solvent recovery systems, and the fire and explosion hazards which attend the use of the first procedure; furthermore, it eliminates the rather considerable power costs which may be involved in the application of the second procedure. The fusion method is simple and requires merely a source of heat and means for mechanical agitation, with minimum power consumption.

While in the practice of the invention the materials may be blended in various ways for certain purposes, or within certain proportions, we have discovered that in following the third of the foregoing procedures, the best results are to be had by first melting the phenol-modified coumarone resin, adding to the melt the vinyl acetate polymer and agitating until solution of the latter in the former is complete, and then adding the unmodified coumarone resin. In this manner it is possible to produce much higher ratios of ordinary coumarone resin in compatible solution than with other orders of mixing the three ingredients. Also, the production of homogeneous blends is greatly accelerated as compared with other orders of mixing the three materials.

It is understood that "Vinylite" AYAF is a polymer of vinyl acetate. The particular grade used had a viscosity of 15 centipoises. However, the invention is applicable to other vinyl acetate polymers, such as those of different viscosity, and thus of different degree of polymerization, and others. This is evidenced by the following data obtained by actual tests:

| Vinyl acetate polymer | Viscosity | Maximum percent "Nevindene" R-3 in 9:1 blend of "Nevillac" and stated vinyl acetate polymer |
|---|---|---|
| | C. p. s. | |
| "Vinylite" AYAA | 7 | 56.5 |
| "Vinylite" AYAF | 15 | 58.3 |
| "Vinylite" AYAT | 25 | 56.5 |
| "Gelva"* | 15 | 56.5 |

*Shawinigan Products Corp., New York, N. Y.

It will be observed that despite wide variations in the viscosity of the "Vinylite" used, the compatibility was not disturbed. Also, the same compatibility was observed with the "Gelva" resin, which is supposed to be a vinyl acetate polymer similar in character to "Vinylite." These results serve to illustrate the mutual solubilization which characterizes the present invention regardless of the origin, type or viscosity of the vinyl acetate polymer.

Moreover, in the investigations of the tri-component systems referred to above, the characteristics and physical properties of the blends were closely alike as far as could be determined. Particularly, the compositions showed great strength and lack of brittleness even though the vinyl acetate polymer content was less than 5 per cent of the total composition.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. That method of compounding synthetic resin composition comprising preparing a melt of resin formed from the polymerizable constituents of crude solvent naphtha and produced by polymerization and concurrent phenolic involvement with a phenolic body, adding vinyl acetate polymer to the molten resin, then adding resin compatible with said phenolically involved polymer but incompatible with said vinyl acetate polymer, and agitating to produce homogeneity of the melt.

2. That method of compounding synthetic resin composition comprising melting phenol-modified coumarone resin, adding vinyl acetate polymer to the molten resin, then adding resin compatible with said phenolically involved polymer but incompatible with said vinyl acetate polymer, and agitating to produce homogeneity of the melt, said vinyl acetate polymer constituting at least about 1 per cent of the composition.

3. A method according to claim 2, said resin incompatible with vinyl acetate polymer being cyclopentadiene resin.

4. A method according to claim 2, said resin incompatible with vinyl acetate polymer being alkyd resin.

LYLE M. GEIGER.
WILLIAM D. JOHNSTON, JR.